Dec. 5, 1950  L. A. CORKINS  2,532,698
DISPENSING APPARATUS FOR DISPENSING MEASURED
AMOUNTS OF GRANULAR MATERIAL
Filed Oct. 12, 1945                               2 Sheets-Sheet 1
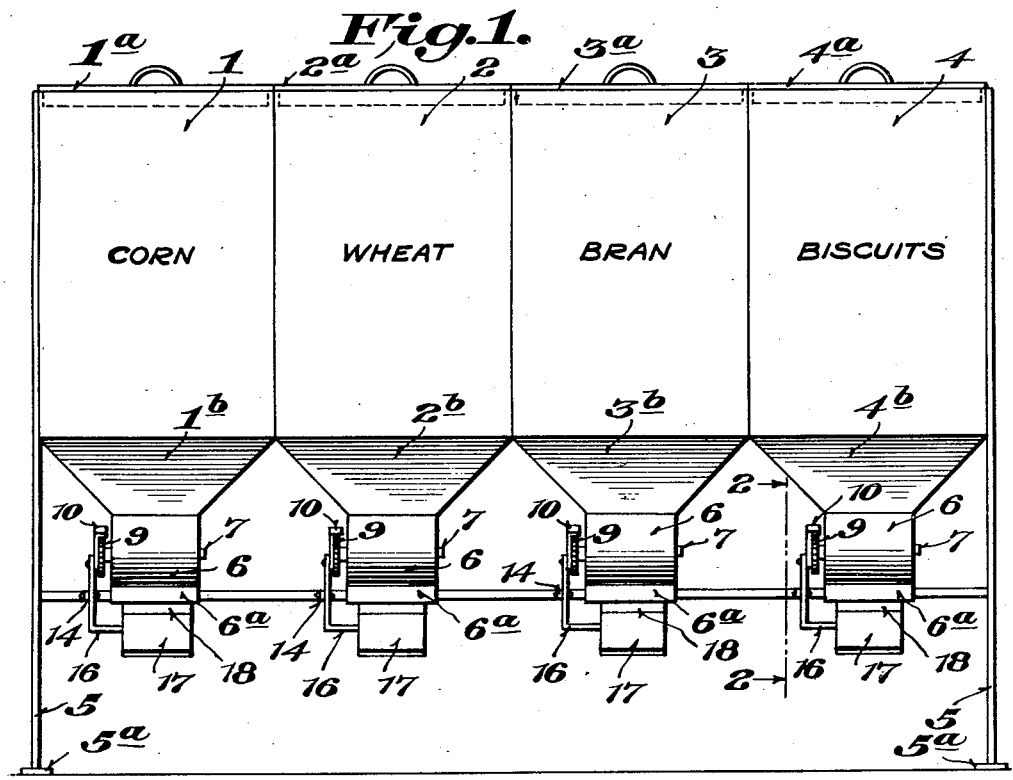
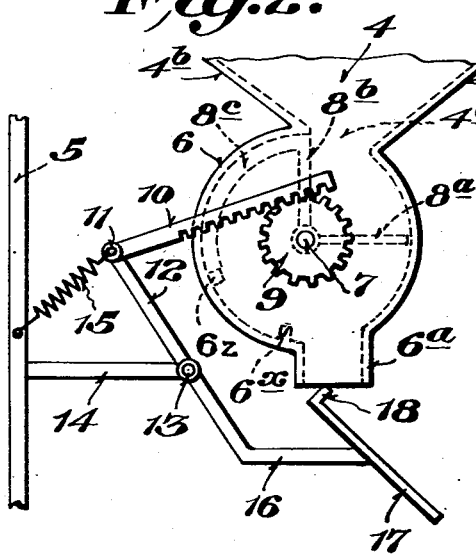
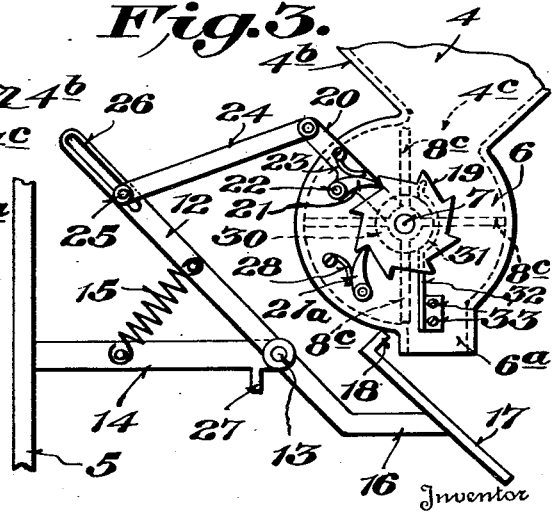
Inventor
Lloyd A. Corkins
By Roy A. Plant
Attorney Dec. 5, 1950 — L. A. CORKINS — 2,532,698
DISPENSING APPARATUS FOR DISPENSING MEASURED AMOUNTS OF GRANULAR MATERIAL
Filed Oct. 12, 1945 — 2 Sheets-Sheet 2

Inventor
Lloyd A. Corkins
By Roy A. Plant
Attorney

Patented Dec. 5, 1950

2,532,698

UNITED STATES PATENT OFFICE 2,532,698

DISPENSING APPARATUS FOR DISPENSING MEASURED AMOUNTS OF GRANULAR MATERIAL

Lloyd A. Corkins, Battle Creek, Mich.

Application October 12, 1945, Serial No. 621,997

11 Claims. (Cl. 222—135)

The present invention relates broadly to dispensing apparatus, and in its specific phases to a dispenser of dry material in loose bulk form.

Considering this invention in its specific phases for ease of understanding the principles involved, it is preferably constructed in the form of a novel breakfast food bulk dispenser adapted to dispense from hoppers a measured quantity, such as an individual portion, of food, particularly dry food, such as corn flakes, puffed wheat, bran flakes, bite size shredded wheat or the like, into a bowl held below the discharge orifice of the related hopper. The bowl, under conditions of use, being thrust against a pusher which in turn actuates or partially rotates a measuring wheel in the discharge orifice of the related hopper, the amount discharged preferably, but not necessarily, being one individual portion of the food. My dispenser thereby obviates the necessity of separately packaging the food in cartons of individual portion size, and thereby effects a material saving in carton paper and packaging operations, as well as serving time.

Due to the present paper shortage the discontinuance of the use of individual size (one ounce) cartons is desirable, and my invention renders it possible to supply ready-to-eat breakfast cereals in bulk for individual servings instead of using packages varying from one to several ounces. A carton containing ten pounds of ready-to-eat corn flakes only costs about 90 cents, while the individual one ounce packages in a 200-carton package cost about $2.88 for the cartons alone. My dispensing device is particularly adapted for use in restaurants and the like since same will effect a substantial saving in labor and material.

Accordingly among the objects of the present invention is the provision of a hopper type dispensing mechanism particularly adapted for actuation to dispense measured quantities of a loose dry material such as ready-to-eat breakfast foods.

Another object is to provide a novel actuating mechanism for operating the measuring portion of the apparatus.

Another object is to provide brake means to prevent dispensing movement of the measuring portion of the apparatus between positive actuations thereof.

A further object of the invention is to make possible the use of either a one direction rotary measuring mechanism, or an oscillatory measuring mechanism.

A further object is to provide a dispensing apparatus of the character described which is positive in action, and of relatively simple construction.

Still further objects and advantages will appear as the description proceeds.

To the accomplishment of the foregoing and related ends, the invention, then, consists of the means hereinafter fully described and particularly pointed out in the claims, the annexed drawings and the following description setting forth in detail certain means for carrying out the invention, such disclosed means illustrating, however, but several of various ways in which the principle of the invention may be used.

In the annexed drawings:

Figure 1 is a front elevational view of a preferred form of my dispenser.

Figure 2 is an enlarged section on the line 2—2, of Figure 1, showing the pusher in starting position.

Figure 3 is a section similar to Figure 2 but showing a modified means for rotating the measuring wheel.

Figure 4:
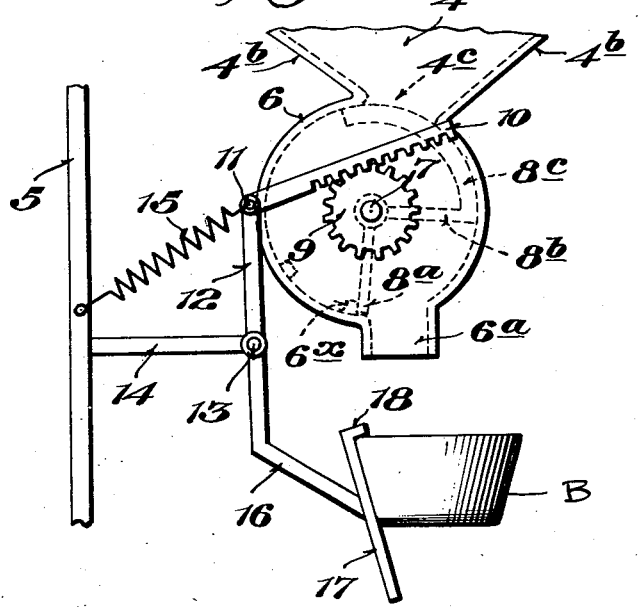
Figure 4 is a section similar to Figure 2 but showing the pusher in dispensing position.

As shown in Figures 1, 2 and 4 the device of the present invention comprises a series of separate hoppers for different ready-to-eat dry cereals, the said hoppers 1, 2, 3 and 4 being of substantially equal size and shape and disposed side by side, said hoppers being open at the top and covered by separate removable closures 1a, 2a, 3a and 4a provided with handles for ready removal of the closures for filling the hoppers with their respective cereals, such as corn flakes, puffed wheat, bran flakes, and bite size shredded wheat biscuits, or the like. Obviously, if desired, a greater or lesser number of hoppers may be provided in any convenient arrangement. The hoppers are preferably supported by a suitable framework 5 including uprights at the four corners of the assembly, the latter being provided with feet 5a for seating upon a table or other support, with the lower ends of the hoppers spaced a suitable distance above said support.

The walls of each individual hopper 1 to 4 inclusive are contracted at their lower ends as at 1b, 2b, 3b and 4b and terminate in a throat such as 4c (Figure 2) of relatively narrow width, said throat registering with the inlet port in the open upper end of a cylindrical valve housing 6 having an outlet port 6a at its lower end. Preferably the throat 4c and the outlet port 6a are disposed to one side of the vertical axis of the housing 6, as shown more particularly in Figures 2 and 3.

A baffle or baffles (not shown) may be installed, if desired, in the hoppers 1 to 4 inclusive, and the same may be adjustable to control the flow of cereal to the contracted throats 4c adjacent the cylindrical housing 6.

As shown in Figures 2 and 4, within each housing 6 is a measuring wheel mounted on a shaft 7 axially disposed with respect to the housing. The wheel has radially disposed walls 8a and 8b preferably disposed 90° apart, and from the outer end of the wall 8b is a trailing arcuate wall 8c. In the normal position of the measuring wheel shown in Figure 2 the wall 8b is substantially vertically disposed opposite one edge of the throat 4c so that the cereal above the throat may pass down by gravity to fill the space between the walls 8b and 8a of the wheel, but when the measuring wheel is rotated in a clockwise direction through an arc of 90°, as shown in Figure 4, the material confined in the wheel between the walls 8a and 8b will drop through the discharge port 6a into the bowl B or other receptacle held directly below the port 6a. In such position of the measuring wheel, the arcuate wall 8c will be moved to underlie the throat 4c as shown in Figure 4, and thus prevent the cereal in the hopper from entering the housing 6 until the measuring wheel is returned sufficiently to uncover throat 4c on the way to normal position shown in Figure 2.

In order to actuate the measuring wheel, a gear 9 (Figures 2 and 4) is provided on the shaft 7 of the wheel beside the housing 6, said gear meshing with a rack bar 10 engaging the top of the gear 9 and having its outer end pivoted as at 11 on a lever 12 pivoted as at 13 on a fixed strut 14 extending from the frame of the dispenser, said lever 12 being yieldably maintained in the position shown in Figure 2 by a spring 15 having one end secured to the lever 12 adjacent pivot 11 and its other end fixed to the frame of the dispenser.

Since the rack 10 is in constant engagement with gear 9, the wheel is prevented from rotating independently of the actuation of the pusher plate 17 due to the off-centered weight of the material in the wheel.

The lower end of lever 12 has an offset portion 16 normally underlying the outlet port 6a of housing 6 and carrying an inclined pusher plate 17 having a flange 18 at its upper end, the plate 17 normally being disposed below the outlet port 6a.

The flange 18 at the upper end of the pusher bar is provided for engagement with the upper edge of the bowl B or other cereal receptacle during operation of the mechanism, thus maintaining the bowl B in contact with the pusher plate.

As above stated, when the parts are in the position shown in Figure 2 the space between the walls 8a—8b of the measuring wheel will be filled with material through the throat 4c; but when the plate 17 is pushed by the bowl B or other receptacle into the position shown in Figure 4, the wheel will be rotated to bring the radial wall 8a of the wheel into substantially vertical position whereupon the measured contents between the walls 8a and 8b of the wheel will be discharged by gravity into the bowl.

The swinging movement of the pusher 17 into dispensing position is limited by the stop 6x within the cylindrical housing 6 which contacts the radial wall 8a of the measuring wheel when in such position. As soon as the bowl B is released from the pusher 17 the parts will be returned to normal position as shown in Figure 2 by means of the spring 15.

Figure 5:
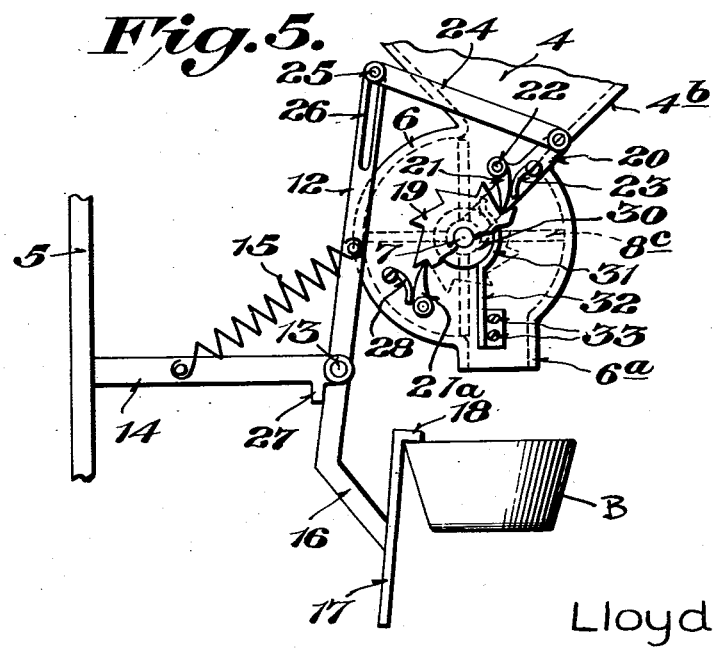
Figure 5 is a section similar to Figure 3 but showing the pusher in dispensing position.

In the modification shown in Figures 3 and 5, the cylindrical housing 6 registers with the throat 4c and is provided with an outlet port 6a, the throat 4c and outlet 6a preferably being offset from the vertical axis of the housing, as in Figures 2 and 4. In this modification the measuring wheel is shown as provided with four radial walls 8c disposed 90° apart; and when in normal position one wall 8c is normally disposed in vertical position below one edge of the throat 4c while the wall 8c located 90° clockwise therefrom is disposed above the outlet port 6a, as shown in Figure 3. While I have illustrated in Figure 3 a four-compartment measuring wheel, obviously a three, six, eight, or even a greater number of compartments might be used, as desired.

Means are provided for rotating the wheel shown in Figure 3 in the same direction through one-quarter revolution upon each actuation of the pusher plate 17. In Figures 3 and 5 the shaft 7 of the measuring wheel carries a ratchet wheel 19 instead of the gear 9 (Figure 2); and on shaft 7 beside the ratchet wheel 19 is journaled or pivoted an arm 20 carrying a pawl 21 pivoted thereon as at 22 and normally urged to engage the teeth of the upper periphery of the ratchet wheel 19 by a spring 23. The outer end of arm 20 is connected by a link 24 with the lever 12, which lever as in Figure 2 is pivoted as at 13 on the fixed strut 14. Preferably the link 24 carries a pivot 25 which is adjustable in a longitudinal slot 26 in the lever 12 so as to adjust the stroke of arm 20 upon actuation of the pusher plate 17 by the bowl B or other receptacle. Preferably a stop 27 is provided on the strut 14 to limit the swinging movement of lever 12 toward the dispensing position, the lever 12 being normally maintained in the position shown in Figure 3 by spring 15 connecting lever 12 with the strut 14. By adjusting the pivot 25 along the slot 26 the link 24 may be adjusted so that the arm 20 will rotate the measuring wheel one-quarter revolution upon each full actuation of pusher plate 17.

In order to prevent backward rotation of the measuring wheel a second pivoted pawl 21a is mounted on the housing 6 normally urged into engagement with the teeth adjacent the lower periphery of the ratchet wheel 19 by a spring 28 so that when the arm 20 is being returned to the normal position shown in Figure 3, the pawl 21a will prevent the wheel from rotating in the reverse or anti-clockwise direction due to friction between the actuating pawl 21 and the ratchet teeth 19.

In Figures 3 and 5 it is necessary to provide means for preventing the measuring wheel from rotating in a clockwise direction due to the weight of the material in the loaded compartment of the wheel below the throat 4c which compartment is off-centered with respect to the axis of the shaft 7.

Some breakfast foods are heavier than others. For instance grapenuts are relatively heavier than puffed wheat foods, which latter are very light per unit volume. As shown, I preferably provide a brake drum 30 (Figures 3 and 5) on shaft 7 engaged by arcuate shoe 31 carried by a flexible arm 32 mounted on the housing 6 by means of bolts or screws 33 extending through a flange of the arm 32, said arm 32 being thereby adjustable to vary the pressure of the arcuate shoe 31 against the drum 30, whereby the shaft 7 will be frictionally prevented from rotating in a clockwise direction. The brake assembly 30—31 further serves to stabilize the rotary measuring mechanism so that the measuring wheel will not continue to turn under quick throw of the pusher plate 17 or under the weight of the cereal carried by the loaded compartments of the measuring wheel. Thus my dispenser, instead of being used for cereals, may be used for dispensing relatively heavy materials in which event the brake assembly 30—31 is an important feature due to the fact that the throat 4c and the delivery port 6a are offset from the vertical axis of the wheel.

When the bowl B has engaged the pusher plate 17 and shifted the plate into the position shown in Figure 5, the measuring wheel will have been rotated through an arc of 90° so as to discharge into the bowl the contents carried between an adjacent pair of walls 8c of the wheel. Upon release of the bowl from the pusher plate 17 the parts will return by action of spring 15 to normal position shown in Figure 3 so that the compartment of the measuring wheel underlying the throat 4c will be filled with cereal from the related hopper.

By the above construction the pusher plate 17 is adapted to be pushed by the cereal bowl or receptacle which is to be filled, and the parts are designed to rotate the measuring wheel far enough to measure out and dispense one individual portion of cereal, such as an ounce, through the outlet port 6a into the bowl or receptacle.

With the apparatus of the present invention it is easier to dispense a standard portion of dry ready-to-eat breakfast cereal which comes in large bulk packages, than it is to cut and serve individual packages. An apparatus adapted for bulk delivery of the type of cereals described is accordingly a prime object of the present invention.

Other modes of applying the principle of my invention may be employed instead of those explained, change being made as regards the mechanism herein disclosed, provided the means stated by any of the following claims or the equivalent of such stated means be employed.

I therefore particularly point out and distinctly claim as my invention:

1. A bulk dispenser, comprising a hopper having an open upper end, the lower end of said hopper contracting into a throat; a housing having an opening in its upper end registering with said throat and having a discharge port at its lower end; a measuring wheel journaled within said housing having a pocket normally registering with the throat; a pusher normally underlying the said port and adapted to be shifted by contact with a receptacle when positioned under the port; means for rotating the wheel to bring the pocket opposite the port with each shifting movement of the pusher, said means comprises a shaft journaled in the housing carrying the wheel; a pinion on said shaft; a lever swingably mounted adjacent the housing and carrying the pusher; means for yieldably maintaining the lever in position to bring the pusher below the discharge port; a rack bar pivotally connected with the lever and engaging said pinion, and means for limiting the shifting movement of the pusher.

2. A bulk dispenser, comprising a hopper having an open upper end, the lower end of said hopper contracting into a throat; a housing having an opening in its upper end registering with said throat and having a discharge port at its lower end; a measuring wheel journaled within said housing having a pocket normally registering with the throat; a pusher normally underlying the said port and adapted to be shifted by contact with a receptacle when positioned under the port; means for rotating the wheel to bring the pocket opposite the port with each shifting movement of the pusher, said means comprises a shaft journaled in the housing carrying the wheel; a pinion on said shaft; a lever swingably mounted adjacent the housing and carrying the pusher; means for yieldably maintaining the lever in position to bring the pusher below the discharge port; a rack bar pivotally connected with the lever and engaging said pinion; said wheel having a single pocket shiftable between the throat and discharge port and having an arcuate wall trailing the trailing end of the pocket for closing the throat when the wheel is oscillated out of normal position; and a stop means adapted to contact the leading end of the pocket when in fully discharging position.

3. A bulk dispenser, comprising a hopper having an open upper end, the lower end of said hopper contracting into a throat; a housing having an opening in its upper end registering with said throat and having a discharge port at its lower end; a measuring wheel journaled within said housing having a pocket normally registering with the throat; a pusher normally underlying the said port and adapted to be shifted by contact with a receptacle when positioned under the port; means for rotating the wheel to bring the pocket opposite the port with each shifting movement of the pusher, said means comprises a shaft journaled in the housing carrying the wheel; a ratchet wheel on said shaft; a lever swingably mounted adjacent the housing and carrying the pusher; means for yieldably maintaining the lever in position to bring the pusher below the discharge port; an arm journaled on the shaft beside the ratchet wheel; a spring pressed pawl on said arm engaging the periphery of the ratchet wheel; a link connecting the arm with the said lever; and means for limiting the swinging movement of the lever.

4. A bulk dispenser, comprising a hopper having an open upper end, the lower end of said hopper contracting into a throat; a housing having an opening in its upper end registering with said throat and having a discharge port at its lower end; a measuring wheel journaled within said housing having a pocket normally registering with the throat; a pusher normally underlying the said port and adapted to be shifted by contact with a receptacle when positioned under the port; means for rotating the wheel to bring a pocket opposite the port with each shifting movement of the pusher, said wheel having a series of pockets, one pocket normally communicating with the throat; means for permitting only forward rotation of the pocket containing wheel; and brake means for restricting forward rotation of the wheel to movement under action of the pusher means.

5. A bulk dispenser, comprising a hopper having an open upper end, the lower end of said hopper contracting into a throat; a housing having an opening in its upper end registering with said throat and having a discharge port at its lower end; a measuring wheel journaled within said housing having a pocket normally registering with the throat; a pusher normally underlying the said port and adapted to be shifted by contact with a receptacle when positioned under the port; means for rotating the wheel to bring the pocket opposite the port with each shifting movement of the pusher, said means comprises a shaft journaled in the housing carrying the wheel; a ratchet wheel on said shaft; a lever swingably mounted adjacent the housing and carrying the pusher; means for yieldably maintaining the lever in position to bring the pusher below the discharge port; an arm journaled on the shaft beside the ratchet wheel; a spring pressed pawl on said arm engaging the periphery of the ratchet wheel; a link connecting the arm with the said lever; means for limiting the swinging movement of the lever; said wheel having a series of pockets, one pocket normally communicating with the throat; a second spring pressed pawl preventing backward rotation of the ratchet wheel when the first pawl is being returned by said link to normal position; and brake means for preventing forward rotation of the wheel due to the offset weight of material in the loaded pockets.

6. A bulk dispenser, comprising a series of adjacent hoppers for different materials, each hopper having an open upper end; a common supporting frame for said series of hoppers; removable closures for said open upper ends; the lower ends of each hopper contracting into narrow throats; cylindrical housings below said throats having openings in their upper ends registering with said throats and having discharge ports at their lower ends; said openings and ports being offset at the same side of the vertical axes of the housings; rotatable measuring wheels journaled within said housings having pockets normally registering with their respective throats for receiving material from their related hoppers and upon rotation of the wheel discharging same through their related discharge ports; pushers normally underlying the said ports and adapted to be shifted by contact with material receiving receptacles when the latter are positioned under the discharge ports; linkage means actuated by the pushers for advancing their related wheels to bring a pocket opposite its port upon each shifting movement of the related pusher; and means on said common frame for pivotally supporting each of said means actuated by the pushers, said linkage means comprising shafts journaled in each housing carrying the related wheel; pinions on said shafts; levers swingably mounted adjacent the housings and carrying the related pushers; means for yieldably maintaining the levers in position to bring the pushers below the ports; racks pivotally connected with the levers and engaging said pinions, and means for limiting the shifting movements of the pushers.

7. A bulk dispenser, comprising a series of adjacent hoppers for different materials, each hopper having an open upper end; a common supporting frame for said series of hoppers; removable closures for said open upper ends; the lower ends of each hopper contracting into narrow throats; cylindrical housings below said throats having openings in their upper ends registering with said throats and having discharge ports at their lower ends; said openings and ports being offset at the same side of the vertical axes of the housings; rotatable measuring wheels journaled within said housings having pockets normally registering with their respective throats for receiving material from their related hoppers and upon rotation of the wheel discharging same through their related discharge ports; pushers normally underlying the said ports and adapted to be shifted by contact with material receiving receptacles when the latter are positioned under the discharge ports; linkage means actuated by the pushers for advancing their related wheels to bring a pocket opposite its port upon each shifting movement of the related pusher; and means on said common frame for pivotally supporting each of said means actuated by the pushers, said linkage means comprising shafts journaled in each housing carrying the related wheels; pinions on said shafts; levers swingably mounted adjacent the housings and carrying the related pushers; means for yieldably maintaining the levers in position to bring the pushers below the discharge ports; racks pivotally connected with the levers and engaging said pinions, means for limiting the shifting movements of the pushers; said wheels each having a single pocket normally communicating with the related throat, and said pocket being oscillatable between the throat and discharge port; said wheels each having an arcuate wall trailing the trailing wall of the pocket for closing the throat when the wheel is oscillated out of normal position; and stop means adapted to contact the leading ends of the pockets when in fully discharging positions.

8. A bulk dispenser, comprising a series of adjacent hoppers for different materials, each hopper having an open upper end; a common supporting frame for said series of hoppers; removable closures for said open upper ends; the lower ends of each hopper contracting into narrow throats; cylindrical housings below said throats having openings in their upper ends registering with said throats and having discharge ports at their lower ends; said openings and ports being offset at the same side of the vertical axes of the housings; rotatable measuring wheels journaled within said housings having pockets normally registering with their respective throats for receiving material from their related hoppers and upon rotation of the wheel discharging same through their related discharge ports; pushers normally underlying the said ports and adapted to be shifted by contact with material receiving receptacles when the latter are positioned under the discharge ports; linkage means actuated by the pushers for advancing their related wheels to bring a pocket opposite its port upon each shifting movement of the related pusher; and means on said common frame for pivotally supporting each of said means actuated by the pushers, said linkage means comprising shafts journaled in each housing carrying the related wheel; ratchet wheels on said shafts; levers swingably mounted adjacent the housings and carrying the related pushers; means for yieldably maintaining the levers in position to bring the pushers below the discharge ports; arms journaled on the shafts beside the ratchet wheels having spring pressed pawls engaging the peripheries of the ratchet wheels; links adjustably connecting the arms with the said levers; and means for limiting the swinging movements of the levers.

9. A bulk dispenser, comprising a series of adjacent hoppers for different materials, each hopper having an open upper end; a common supporting frame for said series of hoppers; removable closures for said open upper ends; the lower ends of each hopper contracting into narrow throats; cylindrical housings below said throats having openings in their upper ends registering with said throats and having discharge ports at their lower ends; said openings and ports being offset at the same side of the vertical axes of the housings; rotatable measuring wheels journaled within said housings having pockets normally registering with their respective throats for receiving material from their related hoppers and upon rotation of the wheel discharging same through their related discharge ports; pushers normally underlying the said ports and adapted to be shifted by contact with material receiving receptacles when the latter are positioned under the discharge ports; linkage means actuated by the pushers for advancing their related wheels to bring a pocket opposite its port upon each shifting movement of the related pusher; and means on said common frame for pivotally supporting each of said means actuated by the pushers, said rotatable measuring wheels each having a series of pockets, one pocket normally communicating with the related throat; means for permitting only forward rotation of the ratchet wheels; and brake means for restricting forward rotation of the wheels to movement under action of the rotating means.

10. A bulk dispenser, comprising a series of adjacent hoppers for different materials, each hopper having an open upper end; a common supporting frame for said series of hoppers; removable closures for said open upper ends; the lower ends of each hopper contracting into narrow throats; cylindrical housings below said throats having openings in their upper ends registering with said throats and having discharge ports at their lower ends; said openings and ports being offset at the same side of the vertical axes of the housings; rotatable measuring wheels journaled within said housings having pockets normally registering with their respective throats for receiving material from their related hoppers and upon rotation of the wheel discharging same through their related discharge ports; pushers normally underlying the said ports and adapted to be shifted by contact with material receiving receptacles when the latter are positioned under the discharge ports; linkage means actuated by the pushers for advancing their related wheels to bring a pocket opposite its port upon each shifting movement of the related pusher; and means on said common frame for pivotally supporting each of said means actuated by the pushers, said linkage means comprising shafts journaled in each housing carrying the related wheel; ratchet wheels on said shafts; levers swingably mounted adjacent the housings and carrying the related pushers; means for yieldably maintaining the levers in position to bring the pushers below the ports; arms journaled on the shafts beside the ratchet wheels having spring pressed pawls engaging the peripheries of the ratchet wheels, links adjustably connecting the arms with the said levers; said wheels each having a series of pockets, one pocket normally communicating with the related throat; second spring pressed pawls preventing backward rotation of the ratchet wheels while the first pawls are being returned by said links to normal positions, and brake means for preventing forward rotation of the wheels due to the offset weight of material in the loaded pockets.

11. In a dispensing apparatus of the character described, the combination of a hopper, the lower end of the hopper contracting into a throat, a measuring and dispensing assembly joined to said throat for receiving material therefrom for measuring, said measuring assembly having a rotary measuring wheel mounted therein, a pusher means, means for joining said pusher means to said measuring wheel so that the latter is rotated by actuation of the pusher means, and a brake to hold said measuring wheel in substantially fixed position except when being actuated by said pusher means.

LLOYD A. CORKINS.

REFERENCES CITED

The following references are of record in the file of this patent:

UNITED STATES PATENTS

| Number | Name | Date |
|---|---|---|
| 136,643 | Clark | Mar. 11, 1873 |
| 1,277,406 | Gibbons | Sept. 3, 1918 |
| 1,507,867 | Stubbs | Sept. 9, 1924 |